United States Patent Office 3,396,152
Patented Aug. 6, 1968

3,396,152
PROCESS OF CURING AN ACRYLIC
ELASTOMER
James C. W. Henning, Akron, Ohio, assignor to The
Firestone Tire & Rubber Company, Akron, Ohio, a
corporation of Ohio
No Drawing. Filed Mar. 23, 1964, Ser. No. 354,130
2 Claims. (Cl. 260—79.5)

ABSTRACT OF THE DISCLOSURE

An acrylic elastomer, preferably an ester of an alkyl acrylate, methacrylate or ethacrylate in which the alkyl group contains 1 to 8 carbon atoms is milled with an organic peroxide and sulfur on a hot mill and then heated to cure. The elastomer is usually reinforced with a carbon black, a silicon compound, clay, calcium carbonate, etc. The elastomer is intended for use in gaskets, hydraulic hose, electrical insulators, etc.

---

This invention relates to the curing of an arcylic elastomer (usually reinforced) with an organic peroxide, and sulfur; and the resulting cured stock. Such stocks have high oxygen and heat resistance, and are used in gaskets, hydraulic hose, electrical insulators, etc. The reinforcing agent may be any usual amount of a carbon black, a silicon compound, clay, calcium carbonate, etc.

It has been customary to cure the acrylic elastomers with amines. Amines are relatively volatile and vaporize if the stock containing them is allowed to stand for any considerable period before curing. Also, amines tend to corrode the curing mold so that elastomer stock sticks to it, and light goods cured in such molds become colored.

With the peroxide cure of this invention there is no discoloration of the mold, and there is less tendency for the stock to adhere to the mold so that much less mold dope is required. Also, the cure can be carried out within a wider temperature range—for example, 280° to 400° F. With a higher temperature the cure takes only a very few minutes. The stocks compounded with amine curing agents tend to scorch but the peroxide curing agents of this invention have no tendency to scorch, except for a few such peroxides as benzoyl peroxide. An additional advantage in the use of the peroxides is that they are more permanent than the amines and stocks containing them may be stored for considerable lengths of time before being cured, and a further advantage in the use of the preferred peroxides is their freedom from any tendency to scorch.

The acrylic elastomers are copolymers of an alkyl acrylate or alkyl alkacrylate with a minor amount of one or more additional monomers including acrylonitrile, styrene, substituted styrenes, or a diene, including for example: butadiene, isoprene, piperylene, dimethyl butadiene, the pentadienes, the hexadienes, cyclopentadiene, cyclohexadiene, cyclooctadiene, etc. As is known in the art, in such elastomers which include a diene monomer, this monomer constitutes no more than 10 percent of the total weight of the copolymer. The ester may be a lower alkyl acrylate, methacrylate or ethacrylate, or a mixture thereof, as is known in the art. The lower alkyl groups include methyl, ethyl, propyl, isopropyl, the butyls, the amyls, the hexyls, the heptyls and the octyls. A small percentage of modifier may be included in the copolymer, as is known in the art.

The peroxide curing agents are organic peroxides well known in the elastomer art. The inclusion of sulfur as a co-curing agent improves the heat resistance and tear resistance of the cured elastomer. The preferred peroxides are:

Dicumyl peroxide, otherwise known as bis(alpha, alpha-dimethyl dicumyl peroxide) (marketed as a mixture of 40 parts of the peroxide and 60 parts of calcium carbonate, by Hercules Powder Co. as Di-Cup 40C).

1,3-bis(alpha-t-butylperoxypropyl) benzene (marketed by Hercules Powder Co. as Hercules S–890).

2,5-bis(t-butylperoxy)-2,5-dimethyl hexane (marketed with 50% inert carrier by R. T. Vanderbilt Co. as Varox, and by Lucidol Division of Wallace and Tierman as Luperco (101XL).

2,5-dimethyl-2,5-di(t-butylperoxy) hexyne-3 (marketed by said Lucidol Division on 50% inert filler as Luperco 130XL).

Other peroxides which may be used include di-t-butyl peroxide and benzoyl peroxide. The elastomers may be cured at temperatures of 280 to 400° F., for a time which varies inversely with the temperature, such as 90 to 1.5 minutes for the temperatures given. The temperature used will generally be about 300 to 325° F. for a time within the range of 10 to 30 minutes.

For the cure, about 1 to 10 phr. (used herein to refer to parts per 100 parts of rubber or elastomer), and preferably 2 to 5 phr. of peroxide and 0.1 to 5 phr. of sulfur are used depending upon the peroxide employed.

The acrylic elastomers include a copolymer of 95 percent ethyl acrylate and 5 percent acrylonitrile (known as Acrylon EA–5), a copolymer of 88 percent butyl acrylate and 12 percent acrylonitrile (known as Acrylon BA 12), the ethyl acrylate base elastomer known as Thiacril Rubber 44 and the acrylate copolymer elastomer known as Hycar 4021, and other acrylic elastomers available on the market, and more generally any of those identified by the foregoing definition.

The following examples are illustrative. The amounts of the various compounds in the several tables are given in weight percent based on 100 parts of the elastomer.

TABLE I

The basic recipe for the runs recorded in this table was:

Acrylon EA–5 _____ 100
HAF Black _____ 50

Various ingredients were added to this for each run as indicated below.

| Run No. | 1 | 2 | 3 | 4 | 5 |
|---|---|---|---|---|---|
| Stearic acid | 1.0 | 1.25 | 1.0 | 1.0 | 1.0 |
| Sulfur | 1.0 | | 1.0 | 1.0 | 0.5 |
| TETA* | 1.5 | 2.0 | | | |
| Tetrone A** | 2.0 | 2.0 | | | |
| HMDAC*** | | | | 1.5 | |
| Diak No. 2**** | | | 1.5 | | |
| Di-Cup 40C | | | | | 10 |
| Cure Temperature: 310° F., Stress-Strain Properties at 73° F.: | | | | | |
| 300% Modulus, p.s.i.: | | | | | |
| 30 minutes | 950 | | 475 | 825 | |
| 40 minutes | 1,150 | | 525 | | |
| 50 minutes | 1,150 | | 575 | 1,025 | 1,000 |
| Tensile Strength, p.s.i.: | | | | | |
| 30 minutes | 1,450 | 1,950 | 1,300 | 1,200 | |
| 40 minutes | 1,600 | 1,950 | 1,350 | | |
| 50 minutes | 1,525 | 1,975 | 1,425 | 1,575 | 1,825 |
| Ultimate Elongation, Percent: | | | | | |
| 30 minutes | 460 | 260 | 610 | 410 | |
| 40 minutes | 420 | 220 | 620 | | |
| 50 minutes | 400 | 220 | 680 | 420 | 510 |

*TETA = Triethylene tetramine.
**Tetrone A = Dipentamethylenethiuram tetrasulfide.
***HMDAC = Hexamethylenediamine carbamate.
****Diak No. 2 = Ethylenediamine carbamate.

Normal stress-strain properties at 73° F. are shown in Table I for amine- and peroxide-cure systems. (Runs 1–5). All stocks were mixed in masterbatch form in a Banbury mixer; however, the stock finals had to be handled differently. Runs containing triethylene tetramine (Runs 1 and 2) had to be finaled on a cold mill with lots of cooling water to prevent scorching. An initial stock finaled at 100° F., setup before all of the curing agent could be incorporated into the batch. Although the stocks containing other curing agents (Runs 3 and 4) were more stable than the stocks containing triethylene tetramine, caution had to be exercised to prevent scorching. On the other hand, the stock containing the dicumyl peroxide and sulfur (stock No. 5) was finaled on a hot mill at 170° F. and processed quite satisfactorily, and produced a good balance in tensile strength and ultimate elongation. Stocks of this nature could be finaled in a Banbury mixer using temperatures not exceeding about 225° F. using the preferred peroxides of this invention which do not become active until heated to about 300° F. The peroxides which are active at lower temperatures, such as di-tertiary butyl peroxide and benzoyl peroxide do not, of course, show this processing ease and safety, but lie within the scope of the invention.

TABLE II

The basic recipe for the runs recorded in this table was:

Acrylon EA-5 _____ 100
Stearic acid _____ 1.0
Sulfur _____ 1.0

The examples of Table II utilize sulfur as a co-curing agent with several different peroxides. The unaged properties of each of these stocks is good and they give excellent properties after aging as shown by their retained tensile strength and elongation after aging 8 hours at 400° F. In effect, the initial aging period serves as a post-cure thereby enhancing the properties of the stocks. The examples include reinforcing black, and Run No. 10 includes a semi-reinforcing black which gives good properties, and excellent aging when compared with Run No. 6.

TABLE III

| Run No | 5 | 11 | 12 | 13 | 14 |
|---|---|---|---|---|---|
| Acrylon EA-5 | 100 | | | 100 | |
| Thiacril 44 | | 100 | | | |
| Acrylon BA-12 | | | 100 | | 100 |
| HAF Black | 50 | 60 | 60 | 50 | 50 |
| Stearic acid | 1.0 | 1.0 | 1.0 | 1.0 | 1.0 |
| Sulfur | 0.5 | 1.0 | 1.0 | | |
| TETA | | | | 2.0 | 2.0 |
| Tetrone A | | | | 2.0 | 2.0 |
| Di-Cup 40C | 10 | | | | |
| Luperco 130-XL | | 8.0 | | | |
| Hercules S-890 | | | 2.0 | | |
| Cure: Min./° F | 60/320 | 60/310 | 45/310 | 30/310 | 30/310 |
| Stress-Strain Properties at 73° F.: | | | | | |
| Unaged: | | | | | |
| 300% Modulus, p.s.i | 850 | 850 | 975 | 1,675 | 1,750 |
| Tensile Strength, p.s.i | 1,725 | 1,525 | 1,550 | 1,825 | 1,750 |
| Ultimate Elongation, percent | 530 | 560 | 580 | 340 | 300 |
| Aged 8 Hrs. at ° F | 400 | 400 | 400 | 400 | 350 |
| Tensile Strength, p.s.i | 1,575 | 575 | 1,800 | 1,850 | 1,875 |
| Ultimate Elongation, percent | 360 | 560 | 300 | 160 | 170 |
| Stress-Strain Properties at 400° F.: | | | | | |
| Unaged: | | | | | |
| Tensile Strength, p.s.i | 440 | 310 | 270 | 370 | 380 |
| Ultimate Elongation, percent | 330 | 450 | 360 | 200 | 100 |
| Aged 8 Hrs. at ° F | 400 | 400 | 400 | 400 | 350 |
| Tensile Strength, p.s.i | 310 | 80 | 430 | 420 | 390 |
| Ultimate Elongation, percent | 160 | 90 | 160 | 70 | 60 |

Table III compares stocks using different peroxides for curing with stocks using triethylene tetramine. Although the loadings are the same or at higher levels for the peroxide-cured stocks (Runs 5, 11 and 12) compared to the loadings for the amine-cured stocks, the former have lower moduli and higher elongations both at 73° F. and 400° F. The higher elongations after aging show that the stocks will have a longer useful stock life, and the fact that the peroxide-cured stocks can be more highly loaded shows a cost-saving advantage.

TABLE IV

The basic recipe for the runs recorded in this table was:

Arcylon EA-5 _____ 100
HAF Black _____ 40
Stearic acid _____ 1.0

| Run No | 6 | 7 | 8 | 9 | 10 |
|---|---|---|---|---|---|
| HAF Black | 60 | 60 | 60 | 60 | |
| FEF Black | | | | | 60 |
| Di-Cup 40C | 11 | | | | 11 |
| Hercules S-890 | | 2 | | | |
| Luperco 101-XL | | | 8 | | |
| Luperco 130-XL | | | | 8 | |
| Cure: 60 min. at 310° F., Stress-Strain Properties at 73° F.: | | | | | |
| Unaged: | | | | | |
| 300% Modulu, p.s.i | 825 | 900 | 875 | 1,850 | 675 |
| Tensile Strength, p.s.i | 1,425 | 1,625 | 1,525 | 2,075 | 1,175 |
| Ultimate Elongation, percent | 570 | 550 | 600 | 350 | 620 |
| Aged 8 hrs. at 400° F.: | | | | | |
| Percent Retained Tensile | 126 | 111 | 121 | 95 | 130 |
| Percent Retained Elongation | 58 | 65 | 52 | 74 | 53 |
| Stress-strain properties at 400° F.: | | | | | |
| Unaged: | | | | | |
| Tensile Strength, p.s.i | 350 | 350 | 330 | 540 | 270 |
| Ultimate Elongation, Percent | 350 | 420 | 370 | 160 | 330 |
| Aged 8 Hrs. at 400° F.: | | | | | |
| Percent Retained Tensile | 117 | 120 | 119 | 106 | 137 |
| Percent Retained Elongation | 40 | 40 | 43 | 69 | 42 |

| Run No | 15 | 16 | 17 | 18 | 19 | 20 |
|---|---|---|---|---|---|---|
| Di-Cup 40C | 12.94 | 14.75 | 10.00 | 5.25 | 7.06 | 10.00 |
| Sulfur | 0.91 | 0.44 | 0.00 | 0.44 | 0.91 | 0.50 |
| Cure: 30 min. at 310° F., Stress-Strain Properties at 73° F.: | | | | | | |
| Unaged: | | | | | | |
| 300% Modulus, p.s.i | 475 | 1,300 | | 225 | 225 | 700 |
| Tensile Strength, p.s.i | 1,675 | 1,650 | 1,350 | 1,400 | 1,275 | 1,800 |
| Ultimate Elongation, percent | 700 | 370 | 260 | 870 | 940 | 600 |
| Aged 8 Hrs. at 400° F.: | | | | | | |
| 300% Modulus, p.s.i | 1,175 | 1,250 | | 600 | 675 | 1,050 |
| Tensile Strength, p.s.i | 1,850 | 1,300 | 1,075 | 1,500 | 1,575 | 1,700 |
| Ultimate Elongation, percent | 410 | 310 | 230 | 640 | 560 | 450 |
| Hot Ring Tear, Cured 45 min. at 310° F., lbs./in. at 212° F | 191 | 38 | 14 | 147 | 136 | 131 |
| Shore "A" Hardness, Cured 50 min. at 310° F.: | | | | | | |
| Instant | 35 | 42 | 42 | 36 | 32 | 36 |
| 5-second | 31 | 40 | 40 | 29 | 27 | 34 |

TABLE V

The basic recipe for runs recorded in this table was:

| | |
|---|---|
| Thiacril 44 | 100 |
| Stearic acid | 1.0 |
| Sulfur | 1.0 |
| Luperco 130–XL | 8.0 |

| Run No | 21 | 22 | 23 | 24 | 25 | 26 |
|---|---|---|---|---|---|---|
| HAF Black | 30 | 70 | | | | |
| EPC Black | | | 50 | | | |
| MT Black | | | | 70 | | |
| Hi-Sil 233 | | | | | 50 | |
| Silene EF | | | | | | 70 |
| Triethanolamine | | | | | 1.5 | |
| Cure Temperature: 310° F. for times indicated, Stress-Strain Properties at 73° F.: | | | | | | |
| 300% Modulus, p.s.i.: | | | | | | |
| 30 minutes | 150 | 625 | 350 | 200 | 375 | 500 |
| 60 minutes | 275 | 850 | 475 | 300 | 325 | 550 |
| 90 minutes | 300 | 875 | 625 | 325 | 325 | 575 |
| Tensile Strength, p.s.i.: | | | | | | |
| 30 minutes | 850 | 800 | 1,600 | 725 | 1,100 | 775 |
| 60 minutes | 1,575 | 1,075 | 1,875 | 825 | 1,150 | 800 |
| 90 minutes | 1,800 | 1,100 | 2,075 | 900 | 1,000 | 800 |
| Ultimate Elongation, Percent: | | | | | | |
| 30 minutes | 690 | 670 | 800 | 900 | 950 | 690 |
| 60 minutes | 770 | 570 | 690 | 750 | 940 | 570 |
| 90 minutes | 810 | 550 | 690 | 780 | 930 | 610 |

The results show good results with different reinforcing agents used in different amounts. These reinforcing agents were:

HAF Black is a furnace black
EPC Black is a channel black
MT Black is a thermal black
Hi-Sil 233 is a hydrated silica
Silene EF is a calcium silicate It is customary to add a small amount of amine with hydrated silicas, and in this instance triethanolamine was used.

Different amounts of sulfur and peroxide were used in the experiments of Table IV to find optimum peroxide and sulfur levels. Run 17 shows that peroxide alone gives a good tight cure, but the tear resistance is low. Run 20 which used the same peroxide level, but with 0.5 phr. of added sulfur shows the following beneficial effects: higher tensile strength, higher elongation, better aging resistance and much better tear resistance. An additional outstanding characteristic of the peroxide-sulfur cure is shown by a comparison of the products of Run 20 with Run 5 in Table III. These stocks have the same level of peroxide and sulfur and show the high resistance to overcuring characteristic of this system; viz 60 minutes at 320° F. used for curing in Run 5 compared to 30 minutes at 310° F. in Run 20. The modulus difference is no greater than expected for the 10 phr. difference in the black loadings.

What I claim is:

1. The process of curing an elastomer of the class consisting of copolymers of alkyl acrylates, alkyl methacrylates, and alkyl ethacrylates in which the alkyl group contains 1–8 carbon atoms which process comprises hot mixing 0.1 to 5 parts of sulfur and 1 to 10 parts of an organic curing agent into 100 parts of the elastomer at a temperature in excess of 100° F. and not exceeding 225° F., the peroxide being from the class consisting of bis(alpha, alpha-methyl dicumyl peroxide), 1,3-bis(alpha-t-butylperoxylpropyl) benzene, 2,5 - bis(t - butylperoxy)-2,5-dimethyl hexane and 2,5 - dimethyl-2,5-di(t-butylperoxy) hexyne-3, and then heating at 280 to 400° F. until the elastomer is cured.

2. The process of claim 1 in which the peroxide is bis (alpha, alpha-methyl dicumyl peroxide), the amount used is substantially 4 parts per 100 parts of the elastomer with substantially 0.5 to 1 part of sulfur, and the elastomer is from the class consisting of alkyl esters of acrylates, methacrylates and ethacrylates in which the alkyl group contains 1 to 8 carbon atoms.

References Cited

UNITED STATES PATENTS

| | | | |
|---|---|---|---|
| 2,925,406 | 2/1960 | McCurdy et al. | 260—79.5 |
| 3,012,016 | 12/1961 | Kirk et al. | 260—79.5 |
| 3,127,379 | 3/1964 | Natta et al. | 260—79.5 |

FOREIGN PATENTS

| | | |
|---|---|---|
| 898,264 | 6/1962 | Great Britain. |

ALLAN LIEBERMAN, *Primary Examiner.*

UNITED STATES PATENT OFFICE
CERTIFICATE OF CORRECTION

Patent No. 3,396,152                                            August 6, 1968

James C. W. Henning

It is certified that error appears in the above identified patent and that said Letters Patent are hereby corrected as shown below:

Column 2, line 11, "Tierman" should read -- Tiernan --; same column, in the table, second column, line 4 thereof, cancel "2.0".

Signed and sealed this 3rd day of March 1970.

(SEAL)
Attest:

Edward M. Fletcher, Jr.                                WILLIAM E. SCHUYLER, JR.
Attesting Officer                                                     Commissioner of Patents